(12) United States Patent
Harmelink

(10) Patent No.: US 7,866,067 B2
(45) Date of Patent: Jan. 11, 2011

(54) HEATER BOX FOR SNOW BLOWER

(75) Inventor: Wesley Kyle Harmelink, Travelers Rest, SC (US)

(73) Assignee: Liquid Combustion Technology, LLC, Travelers Rest, SC (US)

( * ) Notice: Subject to any disclaimer, the term of this patent is extended or adjusted under 35 U.S.C. 154(b) by 110 days.

(21) Appl. No.: 12/283,229

(22) Filed: Sep. 10, 2008

(65) Prior Publication Data

US 2010/0058621 A1 Mar. 11, 2010

(51) Int. Cl.
*E01H 5/09* (2006.01)

(52) U.S. Cl. ........................... 37/244; 37/248; 123/543; 123/545; 123/547

(58) Field of Classification Search .................. 37/244, 37/248, 249, 251, 252, 257, 258; 123/41.7, 123/546, 556, 547, 543, 545, 553, 542; 180/89.2; 261/144, 145

See application file for complete search history.

(56) References Cited

U.S. PATENT DOCUMENTS

| 3,498,280 | A | * | 3/1970 | West et al. ................... 123/555 |
| 3,678,973 | A | * | 7/1972 | Loop ........................... 30/123.4 |
| 4,099,496 | A | * | 7/1978 | Nagase et al. ............. 123/41.31 |
| 4,294,027 | A | * | 10/1981 | Edwards ....................... 37/259 |
| 4,835,405 | A | * | 5/1989 | Clancey et al. ............... 290/1 A |
| 4,890,595 | A | * | 1/1990 | Fischer ........................ 123/556 |
| 6,427,364 | B1 | * | 8/2002 | Heismann et al. .............. 37/219 |
| 6,615,790 | B2 | * | 9/2003 | Andersson et al. ...... 123/195 C |
| 7,096,859 | B2 | * | 8/2006 | Hamisch et al. ............. 123/543 |
| 7,284,508 | B2 | * | 10/2007 | Dopke et al. ............. 123/41.56 |
| 7,482,706 | B2 | * | 1/2009 | Uchimi et al. ............... 290/1 A |
| 2006/0021592 | A1 | * | 2/2006 | Ryczek et al. ......... 123/184.21 |
| 2006/0118069 | A1 | * | 6/2006 | Snyder ....................... 123/54.4 |

OTHER PUBLICATIONS

Briggs & Stratton Corporation; Web site print outs from www.briggsandstratton.com; visited Jul. 29, 2008; copyright 2008 Briggs & Stratton Corporation; (3 pages).

* cited by examiner

*Primary Examiner*—Thomas A Beach
*Assistant Examiner*—Matthew R Buck
(74) *Attorney, Agent, or Firm*—J. Bennett Mullinax, LLC

(57) ABSTRACT

A snow blower is provided that includes a muffler and a heater box that has a top wall. The heater box has a plurality of side walls that extend from the top wall. The top wall and side walls define an interior of the heater box. One of the side walls defines a muffler aperture for use in venting exhaust gases from the muffler. The muffler is at least partially located in the interior of the heater box so that the side walls of the heater box surround at least a portion of all of the sides of the muffler.

20 Claims, 8 Drawing Sheets

HEATER BOX FOR SNOW BLOWER

FIELD OF THE INVENTION

The present invention relates generally to snow blowers. More particularly, the present application involves a heater box for a snow blower that functions to increase the temperature of air supplied to a carburetor of the snow blower to result in more efficient operation of the device.

BACKGROUND

Snow blowers are employed in order to reduce the time and labor needed to clear snow from areas such as sidewalks and driveways. Walk behind snow blowers feature a snow intake that collects fallen snow and transfers same to a chute that establishes the output direction of snow from the snow blower. Gasoline powered engines are present on such devices for providing the power necessary to transfer and direct the accumulated snow in addition to providing power for propelling the walk behind snow blower. Snow blowers are designed with certain features in order to function properly in the cold weather environments in which they are employed. For example, the recoil starter grips of certain snow blowers are oversized so that a user wearing mittens or gloves is capable of easily grasping and manipulating the grip.

The gasoline engines of snow blowers employ carburetors that are supplied with ambient air. The conditions in which snow blowers operate cause cold air to be introduced into the carburetor that can result in less than optimal performance of the engine. As such, it is known to provide a heater box on the snow blower for the purpose of heating air that is supplied to the carburetor. Although effective for its intended purpose, certain challenges may be present though the employment of a heater box such as hot spots and fume build-up. Environmental conditions present during the use of a snow blower also subject the device to high amounts of moisture in the form of snow, sleet and rain. Moisture can have an adverse effect on the performance and longevity of various portions of the snow blower such as mechanical linkages and electronics. Further, the presence of a gas tank on the snow blower introduces yet further design considerations. For example, gasoline spillage during refueling of the device needs to be considered when designing the gas tank and associated elements. Also, the presence of a gas tank in the environment to which the snow blower is employed subjects the gas tank to elements such as thrown ice or snow that may cause problems to various portions of the snow blower. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
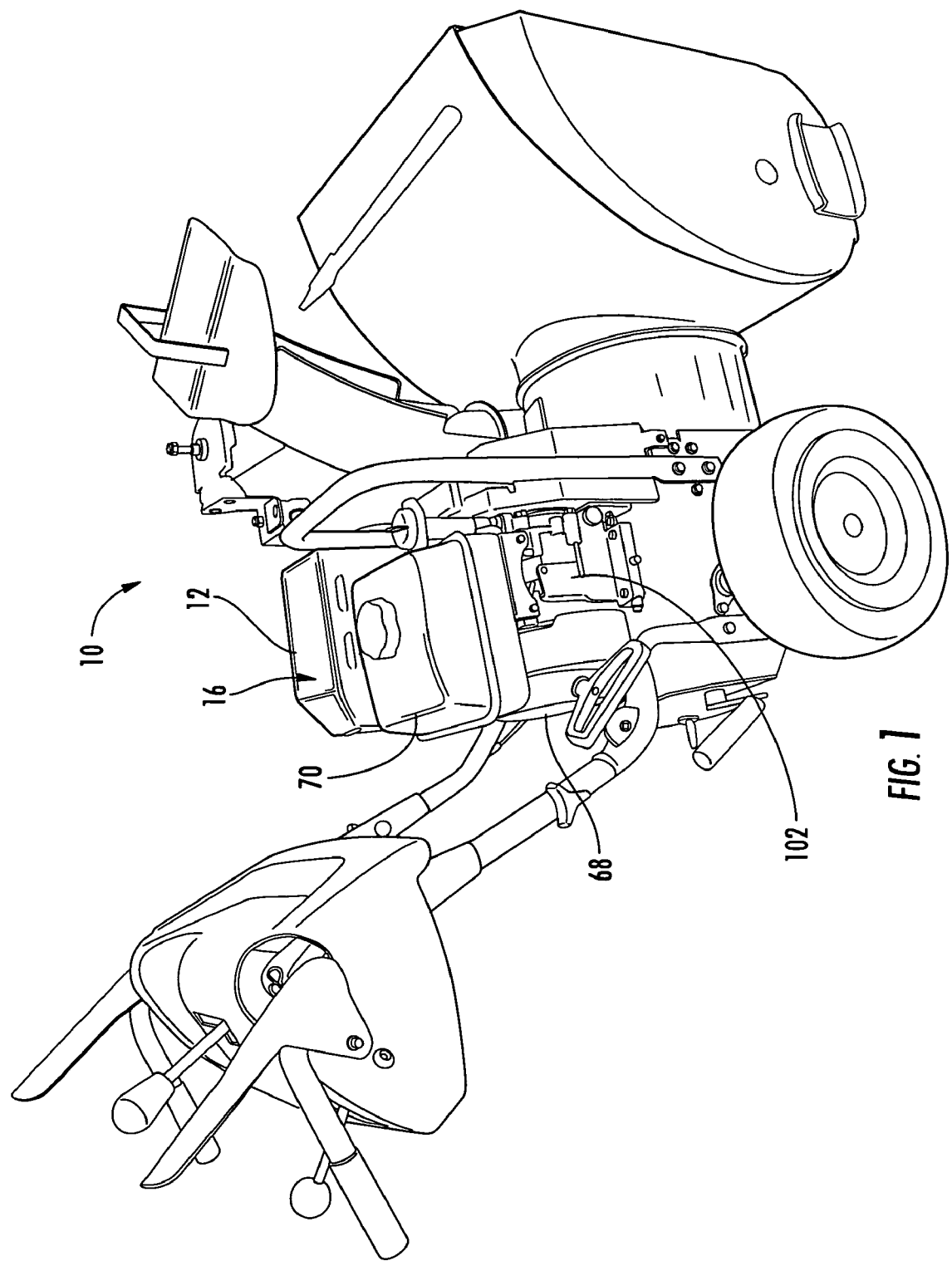
FIG. 1 is a perspective view of a snow blower that that includes a heater box in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a heater box 12 for use with a snow blower 10 that may be used in order to heat the air supplied into a carburetor 104 that is eventually supplied to a motor 102 of the snow blower 10. The heater box 12 may be arranged so as to be capable of venting fumes that may build up in the heater box 12 and can be provided with heat shields that prevent the formation of hot spots and function to protect electrical components carried by the heater box 12 from temperature damage. The snow blower 10 may also be provided with features that function to reduce the risk of fire and/or corrosion to various portions of the device. For example, a gas tank 70 of the snow blower 10 may be arranged so that spilled gasoline is urged away from a recoil intake section 68 of the snow blower to reduce the risk of causing an accidental fire. Further, various guards may be employed to protect components and areas of the snow blower 10, for example a governor linkage 86, from damage through exposure to the elements into which the snow blower 10 is employed.

FIG. 1 illustrates a snow blower 10 in accordance with one exemplary embodiment of the present invention. The snow blower 10 is a walk behind snow blower in that the operator stands behind and controls the device as it is propelled forward through actuation of the motor 102. The motor 102 also functions to provide the power necessary for driving a snow intake section that collects fallen snow for ejection out of a chute of the snow blower 10 in a known manner. The motor 102 is arranged so that a recoil intake section 68 faces towards the operator of the device and hence away from the snow intake section. The recoil intake section 68 is actuated by a user through the pulling of a hand grip which functions to start the motor 102. Although shown as employing a manual start, it is to be understood that the recoil intake section 68 can be modified in other exemplary embodiments so that an electric, as opposed to manual, start may be provided. In this regard, a starter motor and associated components can be incorporated into the snow blower 10 to start the motor 102.

Figure 2:
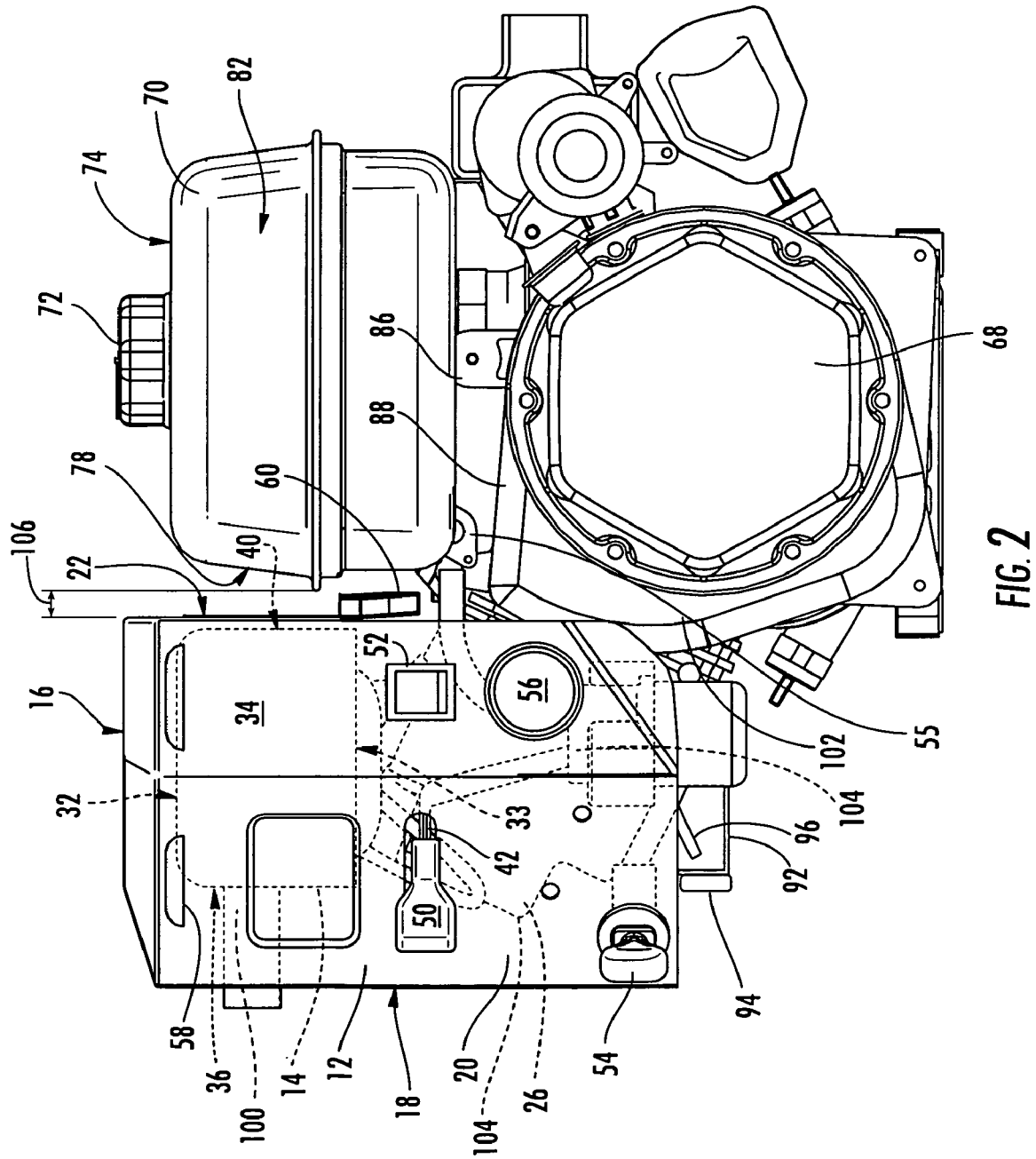
FIG. 2 is a side view of a sub-assembly of the snow blower in accordance with one exemplary embodiment.

With reference now to FIG. 2, a heater box 12 is provided that covers a muffler 14 of the snow blower 10. Muffler 14 becomes hot through normal running of the motor 102 of the snow blower 10. The heater box 12 functions to capture heat generated by the muffler 14 and in turn transfer this heat into air present within the heater box 12 that is supplied to a carburetor 104 of the motor 102. The heater box 12 may function to increase the temperature of the air input to the carburetor 104 an amount up to sixty degrees Fahrenheit hotter than the ambient air temperature. The provision of heated supply air to the carburetor 104 may act to increase the functioning of the motor 102 which would otherwise have decreased functionality through use in the cold environment in which the snow blower 10 is deployed. The heater box 12 includes a top wall 16 from which a plurality of side walls extend. FIG. 2 shows the location of side walls 18, 20 and 22. Side wall 24 is shown more fully in FIG. 4. The side walls 18, 20, 22 and 24 along with the top wall 16 define an interior 26 of the heater box 12. The various portions of the heater box 12 can be made out of a variety of materials in accordance with various exemplary embodiments. For example, the top wall 16 and the side walls 18, 20, 22 and 24 may be made out of one millimeter thick sheet steel in accordance with certain exemplary embodiments. The bottom of the heater box 12 may be open. However, it is to be understood that the bottom of the heater box 12 may be closed with a bottom wall that is made form the same material as the other portions of the heater box 12 in accordance with other exemplary embodiments.

Figure 4:
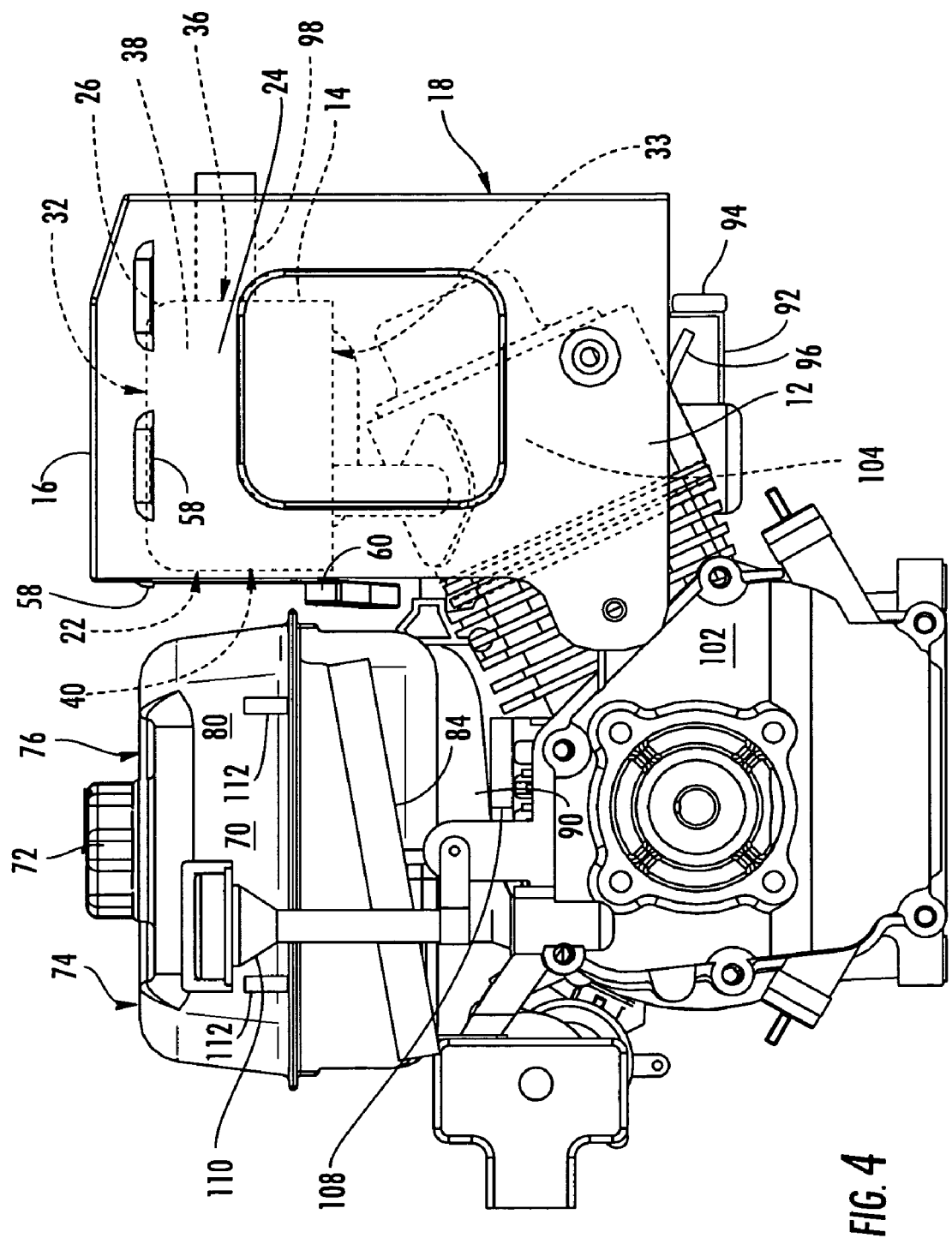
FIG. 4 is an opposite side view of the sub-assembly of FIG. 2.

The muffler 14 may be located within the interior 26 of the heater box 12. As shown with reference to FIG. 2, the muffler 14 may be formed so as to have a top wall 32, bottom wall 33, side wall 34, side wall 36 and side wall 40. An additional side wall 38 may also be included in the muffler 14 and can be seen more clearly with reference to FIG. 4. The muffler 14 is at least partially located in the interior 26 of the heater box 14 so that it is at least partially covered by the walls of the heater box 14. For example, with reference to FIG. 2, the top wall 32 of the muffler 14 is covered by the top wall 16 of the heater box 12. The side wall 34 of the muffler 14 is covered by the side wall 20 of the heater box 12. The side wall 36 of the muffler 14 is covered by the side wall 18 of the heater box 12. Side wall 40 of the muffler 14 is covered by the side wall 22 of the heater box 12. FIG. 4 shows the side wall 38 of the muffler 40 covered by the side wall 24 of the heater box 12. The interior portions of the side walls of the heater box 12 may directly face the exterior portions of the side walls of the muffler 14 such that only empty space is present between these walls.

Figure 3:
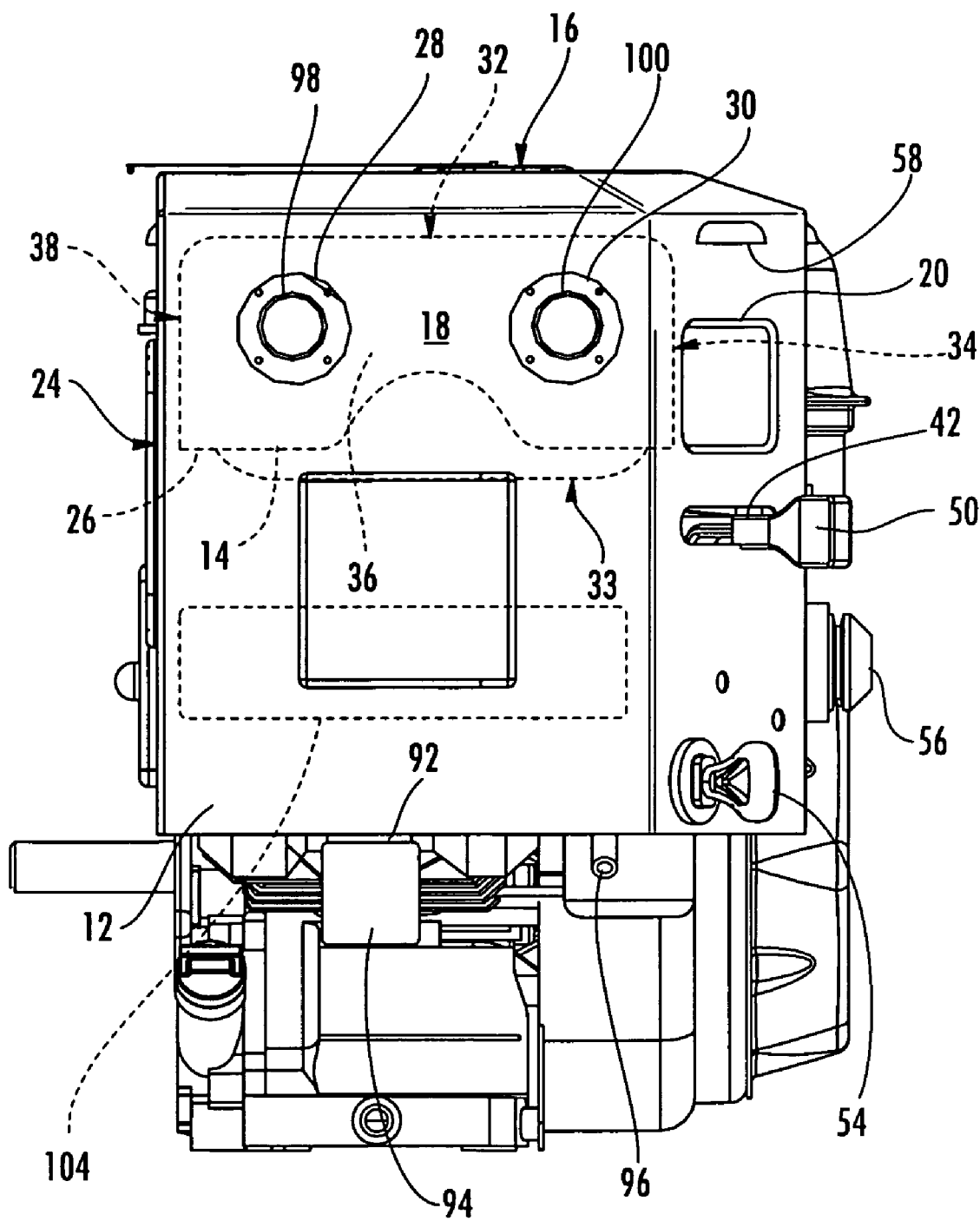
FIG. 3 is a front view of the sub-assembly of FIG. 2.

It is to be understood, however, that the walls of the muffler 14 need not be completely covered by the walls of the heater box 12 to be considered covered. For example, FIG. 3 shows the side wall 18 of the heater box 12 that covers the side wall 36 of the muffler 14. The side wall 18 defines a pair of muffler apertures 28 and 30 therethrough. A muffler exhaust conduit 98 from the muffler 14 extends through aperture 28 so that exhaust gases from the muffler 14 can be discharged. Similarly, muffler exhaust conduit 100 extends from muffler 14 through muffler aperture 30 for the discharge of exhaust gases. The side wall 36 of the muffler 14 may be viewed through the muffler apertures 28 and 30 in the side wall 18. The side wall 18 covers the side wall 36 in that a portion of the side wall 36 is obscured by a portion of side wall 18 which is located directly in front of the side wall 36 when the snow blower 10 is located on level ground as viewed directly in front of the side wall 18. The other side walls and top walls of the heater box 12 and muffler 14 may be arranged in a similar manner. For example, the side wall 40 of the muffler 14 may extend below the side wall 22 of the heater box 12 so that a portion of the side wall 40 is visible and not located directly behind the side wall 22 when the snow blower 10 is level and one views the side wall 22 from a plane normal to the side wall 22. Although a portion of the side wall 40 may not be directly behind the side wall 22 and hence not completely covered or surrounded, certain portions of the side wall 40 are still covered or surrounded by certain portions of the side wall 22.

The muffler 14 may be completely covered by the heater box 12 about the entire perimeter of the side walls 34, 36, 38 and 40 of the muffler 14 along at least a portion of the height of the side walls 34, 36, 38 and 40. In this regard, some portion of the height of the side walls 34, 36, 38 and 40 of the muffler 14 may be covered by the walls of the heater box 12 completely around the muffler 14. Certain exemplary embodiments exist in which the entire height of the side walls 34, 36, 38 and 40 are completely covered by the heater box 12 along the entire perimeter of the side walls 34, 36, 38 and 40. The portions of the height of the side walls of the muffler 14 that may be completely covered by the side walls of the heater box 12 may be located above and/or below the muffler apertures 28 and 30 in accordance with certain exemplary embodiments.

Various controls associated with the motor 102 of the snow blower 10 may be seen with reference to FIG. 2. A choke lever 50 may be present for use in starting the motor 102. The choke lever 50 extends from a choke lever aperture 42 defined in the side wall 20. The choke lever 50 may be moved to various locations with respect to the choke lever aperture 42 by the operator. For instance, when starting the snow blower 10, the choke lever 50 can be moved into an ON position with respect to the choke lever aperture 42. Once the motor 102 begins to run smoothly, the choke lever 50 may be moved to a half choke position with respect to the choke lever aperture 42. Finally, once the motor 102 has had a chance to warm up for a one or two minute period, the choke lever 50 can be slid to an OFF choke position within the choke lever aperture 42. The use of the choke may allow for the motor 102 to be capable of running while cold air is supplied to the motor 102 before the heater box 12 has enough time to function to heat the air supplied to the motor 102. The choke lever 50 may be oversized so as to accommodate operators that are wearing gloves or mittens. Further, the choke lever 50 can be made of pliable plastic so that if an operator presses the choke lever 50 from above or below or supplies excessive force thereto, the choke lever 50 will bend or pull off from an attached linkage within the heater box 12. In this regard, the choke lever 50 can be removed and subsequently replaced without breaking or damaging the mechanical linkage that functions to actuate the choke when the choke lever 50 is slid. The portion of the choke lever 50 that is made of pliable plastic may extend into the choke lever aperture 42 and may extend into the heater box 12 in accordance with certain exemplary embodiments.

An on/off switch 52 may be carried by the heater box 12 and can be located on the same side wall 20 as the choke lever 50. The on/off switch 52 can be switched to the ON position in order to enable the motor 102 to be started. The snow blower 10 may also be provided with a safety key switch 54 that may be placed into a slot on the heater box 12. The snow blower 10 may be arranged so that the snow blower 10 cannot start unless the safety key switch 54 is placed into position. The safety key switch 54 may simply snap into position on the side wall 20 or may need to be snapped into position and turned in accordance with certain exemplary embodiments. The safety key switch 54 may also be located on the same side wall 20 as the choke lever 50 and the on/off switch 52.

The snow blower 10 may also include a primer bulb 56 that is located on the same side wall 20 of the heater box 12 as the choke lever 50, on/off switch 52, and safety key switch 54. A fuel petcock 55 can be turned to an ON position during the starting procedure. Once the safety key switch 54 is properly installed, the user may depress the primer bulb 56 a maximum of three times in order to clear air out of the system and properly prime the line for starting of the motor 102. Next, the operator may grasp and pull the grip of the recoil intake section 68 in order to start the motor 102. In accordance with other embodiments, an electrical start may be provided instead of, or in addition to, a manual grip pull and start. Further, other embodiments are possible in which the primer bulb 56 can be depressed various amounts of times in order to effect proper starting of the motor 102. The side wall 20 is shown as having two planar sections that are arranged at an angle to one another. The aforementioned controls 50, 52, 54 and 56 are split between the two angled planar sections of the side wall 20. However, other exemplary embodiments exist in which the side wall 20 has a single planar section that includes all of the aforementioned controls 50, 52, 54 and 56. The controls 50, 52, 54 and 56 may be arranged with respect to the heater box 12 so that they are oriented towards one side of the snow blower 10. For example, as shown with reference to FIG. 1, the controls 50, 52, 54 and 56 are oriented with respect to the snow blower 10 so that they all face towards the operator of the snow blower 10 when the operator is located behind the snow blower 10 in the normal operating position.

The snow blower 10 may be provided with an ignition control box mounting bracket 92 that is located below the heater box 12. The ignition control box mounting bracket 92 may be mounted to a casted portion of the motor 102 or can be mounted to some other area of the snow blower 10 through a bolted connection. The ignition control box mounting bracket 92 holds an ignition control box 94. The ignition control box 94 can be bolted onto the ignition control box mounting bracket 92. The ignition control box mounting bracket 92 may be arranged so that the ignition control box 94 is not covered by any of the side walls 18, 20, 22 or 24 of the heater box 12. In this regard, the ignition control box 94 may be arranged so that no portion of the ignition control box 94 is covered by the side walls 18, 20, 22 and 24 when the snow blower 10 is on level ground. As such, the ignition control box 94 may be located completely below the bottoms of the side walls 18, 20, 22 and 24. Placement of the ignition control box 94 beyond the heater box 12 may function to reduce the amount of heat imparted onto the ignition control box 94 to reduce damage thereto.

The ignition control box mounting bracket 92 may also mount an outlet of a crank case vent tube 96 thereon. The ignition control box mounting bracket 92 can define an aperture through which the end of the crank case vent tube 96 may be disposed. The fit between the crank case vent tube 96 and the aperture may be a force fit so that the crank case vent tube 96 is securely held thereon. Alternatively, clamps or mechanical fasteners may be used to secure the crank case vent tube 96 to the ignition control box mounting bracket 92. The crank case vent tube 96 is arranged with respect to the ignition control box mounting bracket 92 so that exhaust therefrom is directed away from the interior 26 of the heater box 12.

Figure 6:
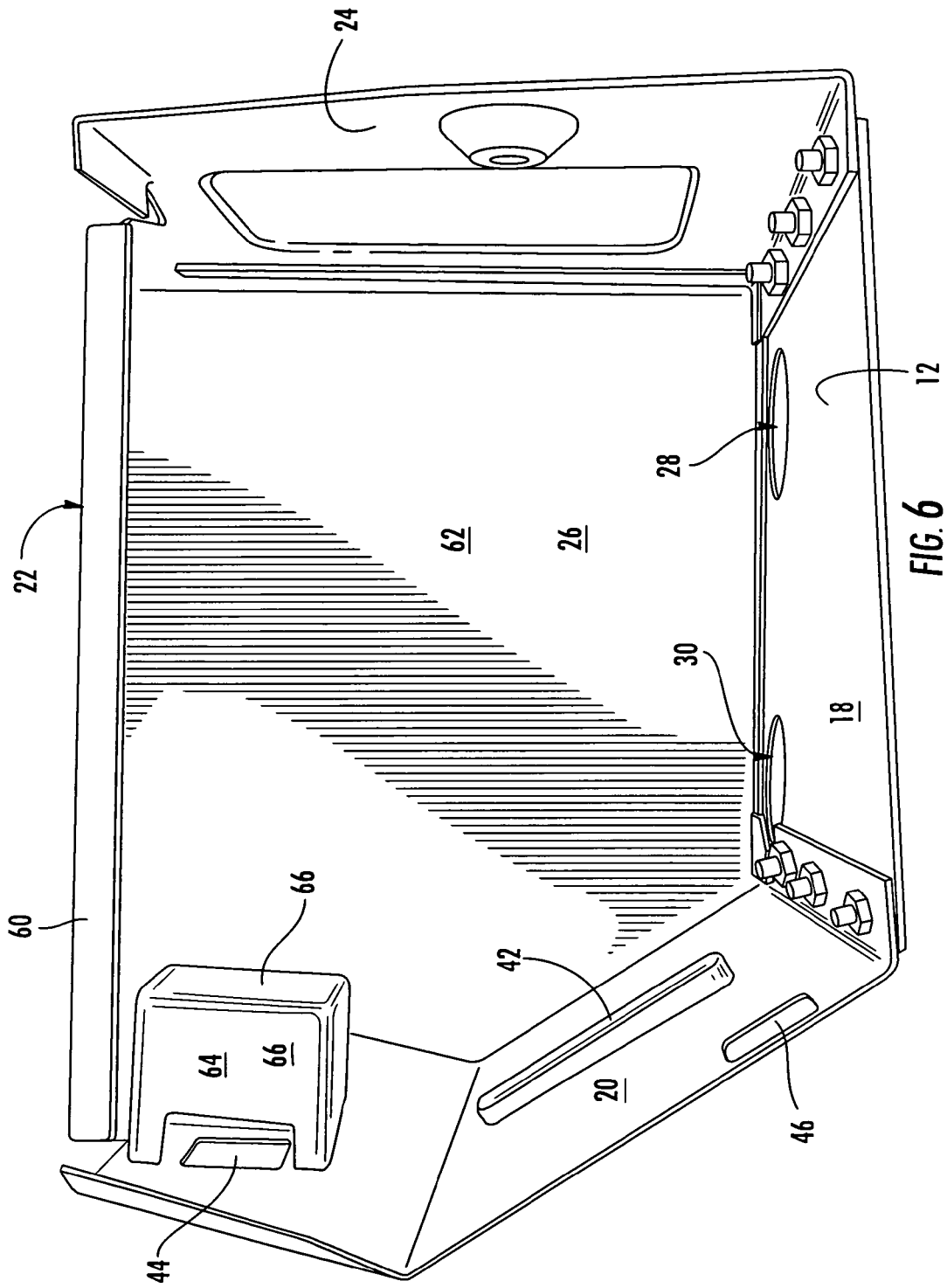
FIG. 6 is a bottom view of a heater box in accordance with one exemplary embodiment.
Figure 7:
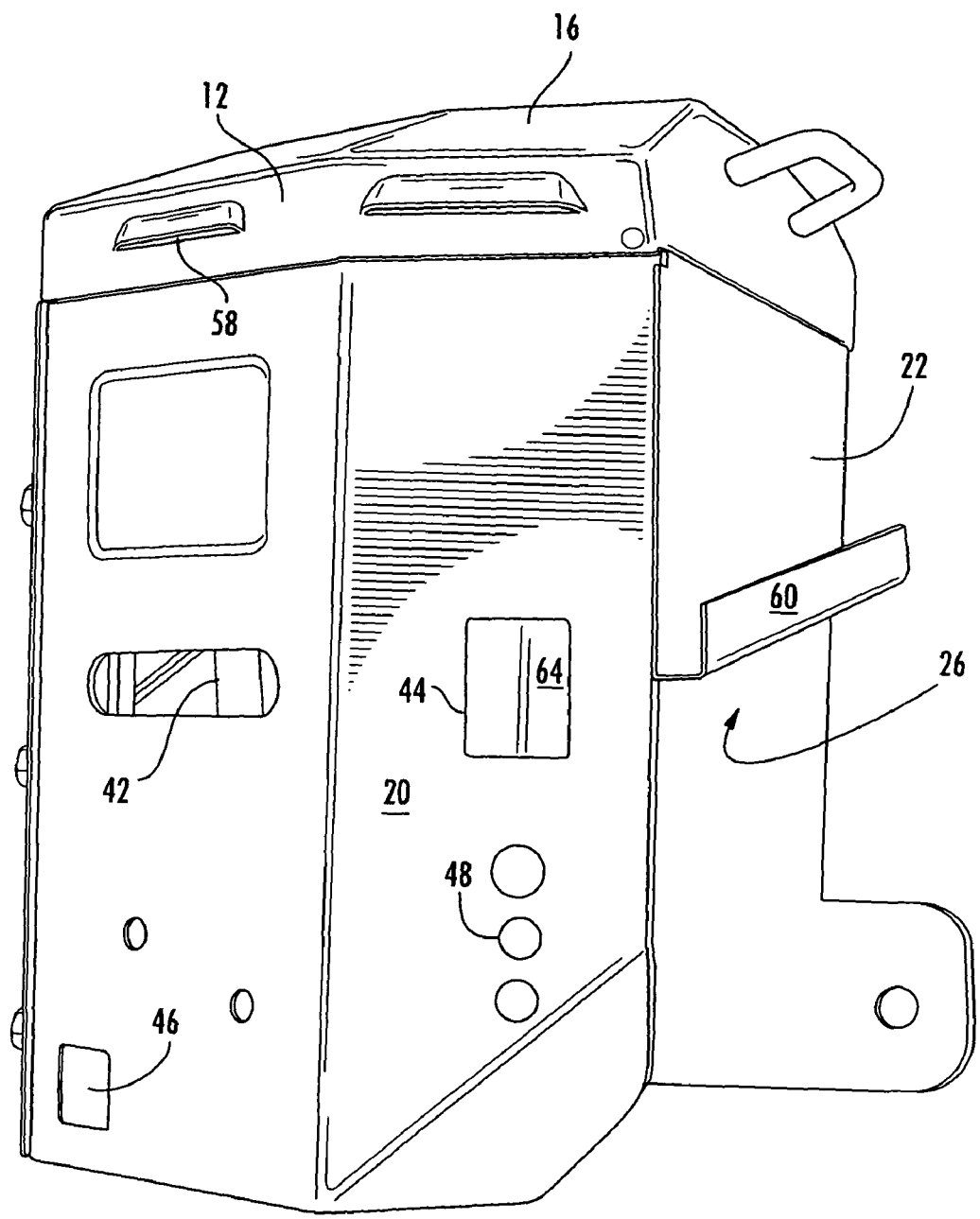
FIG. 7 is a side view of the heater box of FIG. 6.
Figure 8:
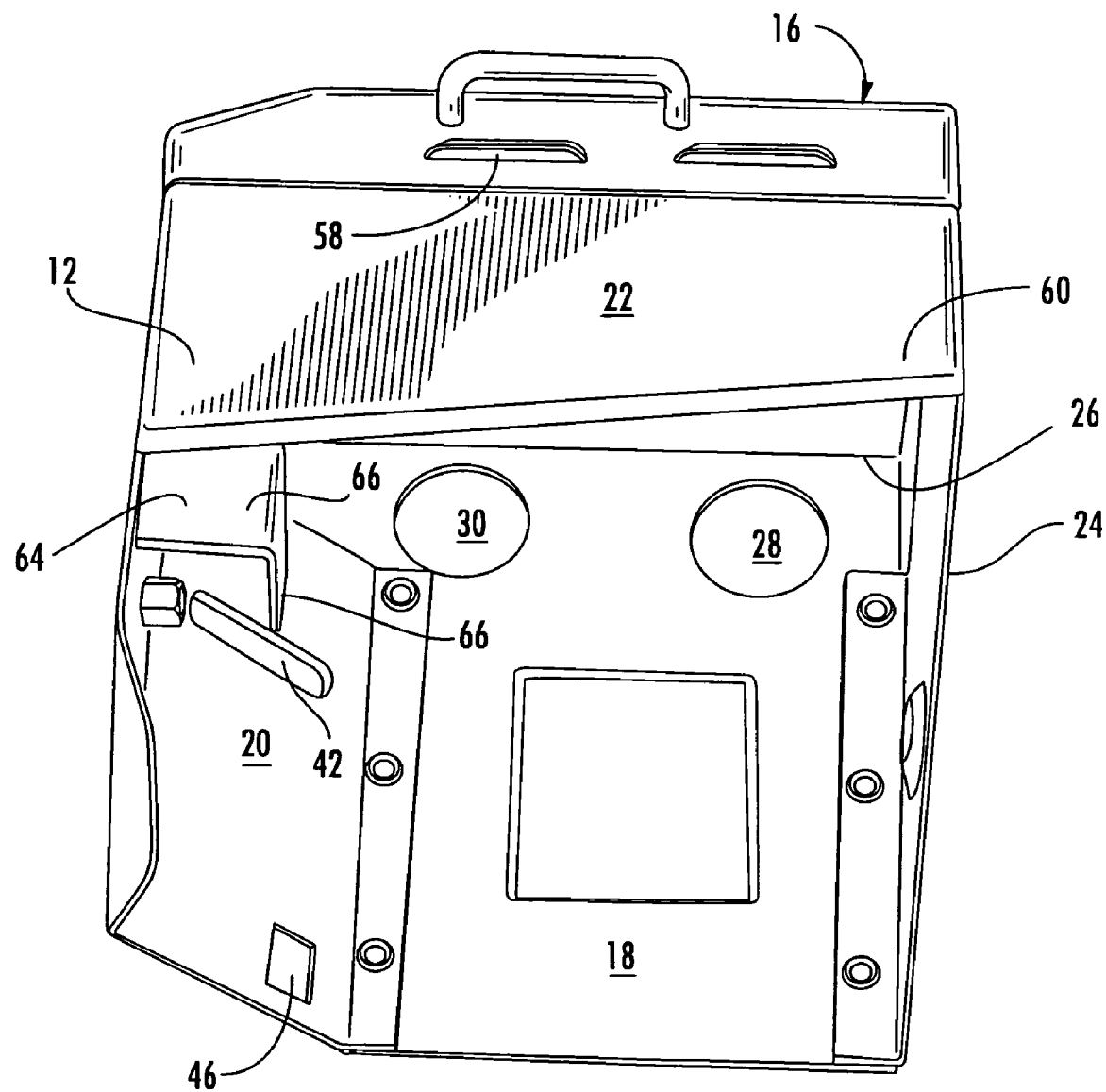
FIG. 8 is a back view of the heater box of FIG. 6.

FIGS. 6-8 show various views of the heater box 12 as removed from associated components of the snow blower 10. The side walls 20, 22 and 24 define a plurality of vents 58 thereon. The vents 58 extend completely through the side walls 20, 22 and 24 to the interior 26 of the heater box 12. The vents 58 are used to vent fumes that may build up in the heater box 12 through operation of the snow blower 10. For example, it may be the case that depression of the primer bulb 56 an excessive amount of times will cause fuel fumes to be produced within the heater box 12. These fumes may rise in the heater box 12 and be removed therefrom via vents 58. The vents 58 can be located proximate to the top wall 16 of the heater box 12. In accordance with certain exemplary embodiments, the vents 58 may be up to two inches from the top wall 16. In accordance with other exemplary embodiments, the vents 58 may be up to one inch away from the top wall 16. However, it is to be understood that other exemplary embodiments exist in which the vents 58 can be located at various locations on the top wall 16 or side walls 18, 20, 22 or 24. The illustrated exemplary embodiment includes a pair of vents 58 on the side walls 20, 22 and 24. Vents 58 are not present on the top wall 16 or side wall 18. The vents 58 are all spaced the same distance from the top wall 16. As mentioned, the vents 58 can be variously arranged in accordance with other embodiments.

A drip ledge 60 is located on the side wall 22. The location of the drip ledge 60 with respect to other components of the snow blower 10 is illustrated in FIG. 2. The drip ledge 60 acts to catch snow, ice and rain that may fall or be blown into the illustrated area between the heater box 12 and the gas tank 70 of the snow blower 10. Further, snow or ice on the exterior of the heater box 12 that is melted by the heater box 12 can also be caught by the drip ledge 60. The drip ledge 60 defines a rectangular shaped cavity capable of holding some amount of ice, snow or rain. The drip ledge 60 is angled with respect to the top wall 16 of the heater box 12 so that caught ice, snow or rain within the drip ledge 60 will flow via gravity downwards to an open end and then off of the drip ledge 60. The drip ledge 60 is shown as being located at the bottom of the side wall 22. However, it is to be understood that the side wall 22 may extend downward below the drip ledge 60 in accordance with other exemplary embodiments.

Although described as being angled with respect to the top wall 16, the drip ledge 60 need not be angled with respect to this component in accordance with other exemplary embodiments. The drip ledge 60 is oriented generally at an angle with respect to level ground onto which the snow blower 10 rests so that the captured elements within the drip ledge 60 can be moved via gravity to a desired location. The drip ledge 60 thus acts to prevent snow, ice or rain from falling within an area between the heater box 12 and the gas tank 70 so that various components of the snow blower 10 are not corroded, short circuited or otherwise damaged. The captured snow, ice and rain are directed towards the front of the snow blower 10 towards the operator and fall off of the snow blower 10 without damaging various components thereof.

The heater box 12 includes an interior heat shield 62 as shown with reference to FIG. 6. The interior heat shield 62 may be made of the same material as the rest of the heater box 12 or can be made of a different material in accordance with other exemplary embodiments. The interior heat shield 62 may be made of one millimeter thick sheet steel and can be arranged so as to contact the side walls 18, 20, 22 and 24 of the heater box 12. The interior heat shield 62 is located above the vents 58 so that fumes within the heater box 12 are not blocked by the interior heat shield 62 and can rise and be removed from the heater box 12 through vents 58. The interior heat shield 62 may be spaced a distance from the top wall 16 so that an empty space is formed between the top of the interior heat shield 62 and the bottom of the top wall 16. The interior heat shield 62 functions to shield the top wall 16 from heat present within the heater box 12 so that a hot spot is not formed on the top wall 16 that may be touched by and burn an operator. The empty space present between the top wall 16 and the interior heat shield 62 may also function to reduce the amount of heat transfer present between the interior heat shield 62 and the top wall 16 so that the amount of heat present at the top wall 16 will be reduced.

The heater box 12 can also be provided with an on/off switch heat shield 64 that is located in the interior of the heater box 12 and has a plurality of walls 66. The walls 66 may be made of the same material as the rest of the heater box 12. For example, the walls 66 may be made of one millimeter thick sheet steel in accordance with certain exemplary embodiments. The walls 66 of the on/off switch heat shield 64 function to shield the on/off switch 52 from heat present within the heater box 12 so that the on/off switch 52 is not damaged through exposure to this heat. The walls 66 of the on/off switch heat shield 64 may contact the on/off switch 52 in certain embodiments or may be spaced from the on/off switch 52 in other arrangements.

The side walls 18, 20 and 24 of the heater box 12 extend the same distance away from the top wall 16. The side wall 22 does not extend the same amount away from the top wall 16 but extends approximately half of the distance away from the top wall 16 as does the other side walls 18, 20 and 24. Other exemplary embodiments are possible in which the side walls 18, 20, 22 and 24 extend the same distance or various distances from the top wall 16 with respect to one another. The heater box 12 may include one or more apertures through which bolts can be disposed for use in mounting the heater box 12 to the motor 102 or other portion of the snow blower 10. Attachment through the use of one or more bolts allows the heater box 12 to be removed in order to service components covered by the heater box 12. However, other mechanisms of attachment are possible in which the heater box 12 is welded or otherwise permanently fixed to one or more components of the snow blower 10.

As shown with reference to FIG. 7, the side wall 20 of the heater box 12 includes various apertures for use in mounting controls of the snow blower 10 thereon. The choke lever aperture 42 is disposed completely through the side wall 20 and extends in a horizontal direction of the heater box 12. A safety key switch aperture 46 is located generally below the choke lever aperture 42 and likewise extends completely through side wall 20. The safety key switch aperture 46 is present for use in mounting the safety key switch 54 to the heater box 12. The side wall 20 also defines an on/off switch aperture 44 through which the on/off switch 52 extends. The on/off switch aperture 44 extends completely through the side wall 20 and is located at the same height and next to the choke lever aperture 42. A primer bulb aperture 48 is located below the on/off switch aperture 44 and extends completely through the side wall 20. The primer bulb aperture 48 is present for use in mounting the primer bulb 56 to the side wall 20. The primer bulb aperture 48 is located at a height above the safety key switch aperture 46. The primer bulb aperture 48 consists of three separate apertures disposed through the side wall 20. Other arrangements are possible in which the primer bulb aperture 48 is a single aperture or is from two to six apertures in number. The choke lever aperture 42 and the on/off switch aperture 44 are located on a portion of the side wall 20 that is angled to the portion on which the safety key switch aperture 46 and the primer bulb aperture 48 are located. Other arrangements are possible in which all of the apertures 42, 44, 46 and 48 are located on the same planar portion of the side wall 20.

As shown with reference to FIG. 2, the heater box 12 is located next to the gas tank 70 and is spaced a distance 106 therefrom. The distance 106 may be the distance from the side wall 22 to a side 78 of the gas tank 70. In the disclosed embodiment, the drip ledge 60 is tucked under a ledge of the gas tank 70 so that the distance 106 represents the closest area between a portion of the heater box 12 and a portion of the gas tank 70. Distance 106 may be up to two inches in accordance with certain exemplary embodiments. The distance 106 may be minimized so that the heater box 12 and the gas tank 70 are located in close proximity to one another so that the amount of ice, snow, rain or other debris that can fall between the heater box 12 and the gas tank 70 is reduced. The heater box 12 and the gas tank 70 may be arranged so that they do not touch one another so that vibration during operation of the snow blower 10 is reduced. However, it is to be understood that these components may touch one another in accordance with other exemplary embodiments.

Figure 5:
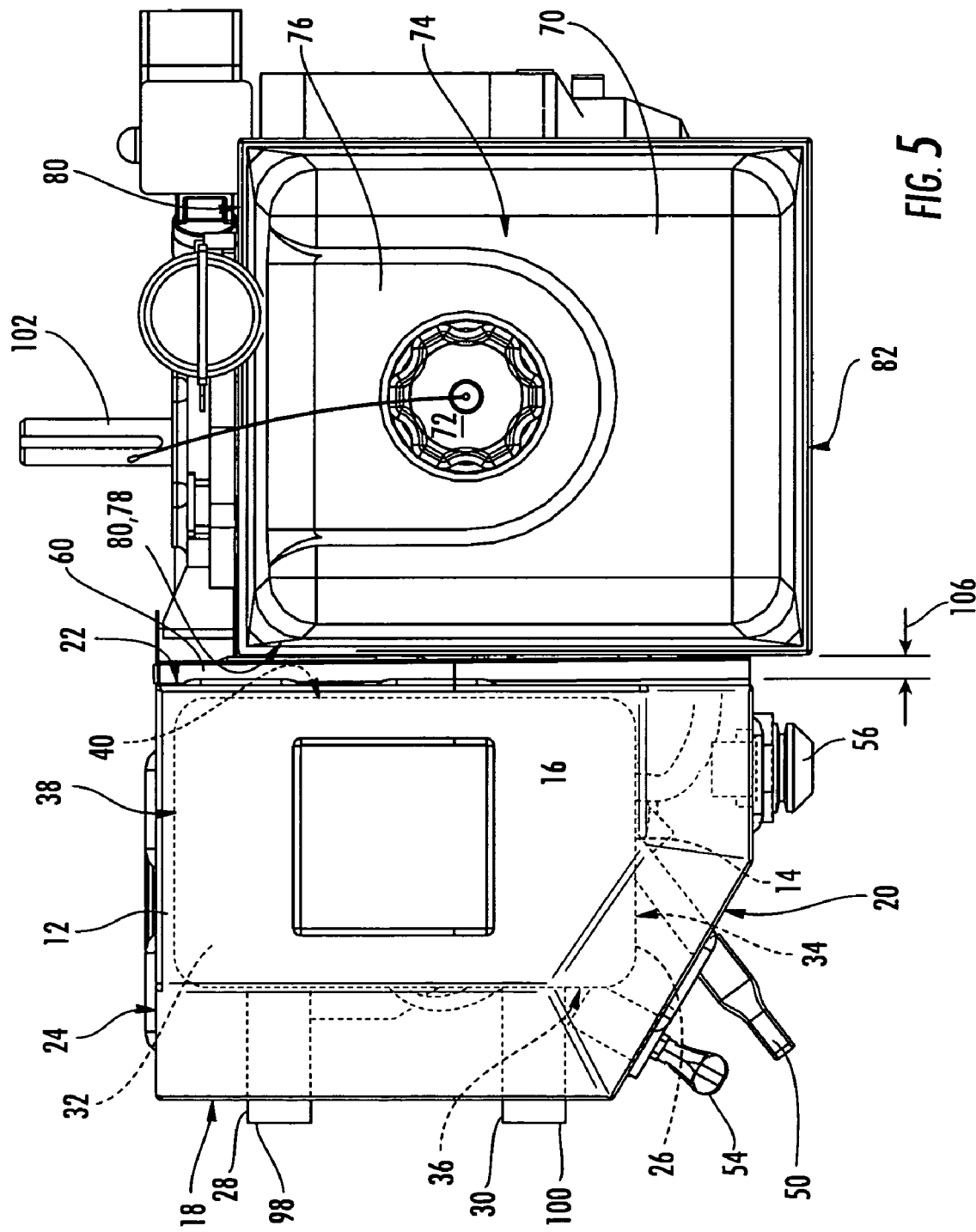
FIG. 5 is a top view of the sub-assembly of FIG. 2.

The top of the gas tank 70 is more clearly shown in FIG. 5. The gas tank 70 has a gas cap 72 that can be opened by an operator to add fuel to the gas tank 70. It is sometimes the case that fuel is spilled during refueling of the gas tank 70 onto the top of the gas tank 70. The top surface 74 of the gas tank 70 defines a spill depression 76 that functions as a channel to direct the flow of spilled gasoline on the gas tank 70. The spill depression 76 may have an angled surface so that the spilled gasoline may flow via gravity to a desired area. The spill depression 76 may also define walls that function like a dam to prevent spilled gasoline from flowing to other portions of the gas tank 70. The spill depression 76 may open on a side of the gasoline tank 70 so that spilled gasoline flows off of the top of the gasoline tank 70 towards a side 80 of the gasoline tank 70. Side 80 is opposite side 82 of the gasoline tank 70. The recoil intake section 68 is located on the same side of the snow blower 10 as side 82 of the gas tank 70. As such, the spill depression 76 is oriented so that spilled gasoline is channeled to a side 80 of the gas tank 70 away from the recoil intake section 68. There may be a lesser chance of having spilled gasoline pulled into the recoil intake section 68 during operation of the snow blower 10 if the spilled gasoline is channeled away from the recoil intake section 68. Such an arrangement may reduce damage caused to the snow blower 10 through the spillage of gasoline.

As shown with reference to FIG. 4, side 80 of the gas tank 70 has a gasoline drip ledge 84 that extends therefrom. The gasoline drip ledge 84 may have a rectangular shaped cavity that is open on one end and closed on an opposite end. The gasoline drip ledge 84 is located so that gasoline that is spilled off of the top surface 74 of the gas tank 70 is caught by the gasoline drip ledge 84 and prevented from contacting other portions of the snow blower 10 and causing damage thereto. The gasoline drip ledge 84 is oriented at an angle with respect to the top surface 74 so that gasoline present therein flows along the gasoline drip ledge 84 via gravity. The gasoline may drip off of the gasoline drip ledge 84 at a desired location so that potential damage to the snow blower 10 is reduced or eliminated.

A pair of splash guards 110 and 112 may extend from the side 80 of the gas tank 70. The splash guards 110 and 112 function to prevent spilled gasoline from traveling to various parts of the snow blower 10. The splash guards 110 and 112 may be positioned so that they are on either side of the spill depression 76 with respect to the spill depression's location on the side 80. The splash guards 110 and 112 thus assist in the channeling of spilled gasoline into the gasoline drip ledge 84.

The gasoline tank 70 may be mounted onto the snow blower 10 by way of a mounting plate 108. An area may be present below the gasoline tank 70 into which snow, ice, rain or other debris may enter and cause damage to the snow blower 10. A half moon shield 90 can be located below the gas tank 70 at side 80. The half moon shield 90 acts as a guard to prevent snow, ice, rain and other debris from entering the area below the gas tank 70. The half moon shield 90 can be attached to the mounting plate 108 in accordance with certain exemplary embodiments or may be attached to a different portion of the snow blower 10.

With reference to FIG. 2, the snow blower 10 includes a governor linkage shield guard 88 that covers a governor linkage 86 of the snow blower 10. the governor linkage shield guard 88 may be attached to the snow blower 10 through the use of two bolts at two different locations. The two bolts may be arranged at ninety degree angles to one another and can be located on opposite sides of the governor linkage shield guard 88 in accordance with various exemplary embodiments. The governor linkage shield guard 88 may be made out of metal such as aluminum or steel and can function to prevent snow, ice, rain or debris from contacting and damaging the governor linkage 86. A portion of the governor linkage shield guard 88 may extend past the side wall 22 of the heater box 12 such that it may be located below the top wall 16 of the heater box 12.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A snow blower, comprising:
   a muffler;
   a heater box that has a top wall, wherein the heater box has a plurality of side walls that extend from the top wall, wherein the top wall and the side walls define an interior of the heater box and form a portion of the exterior outer perimeter of the heater box, wherein one of the side walls defines a muffler aperture for use in venting exhaust gases from the muffler, wherein the muffler is at least partially located in the interior of the heater box such that the side walls of the heater box surround at least a portion of all of the sides of the muffler; and
   a carburetor located in the interior such that the interior is a common interior to both the muffler and the carburetor, wherein air present in the common interior is heated by the muffler and is input to the carburetor from the common interior, wherein the side wall that defines the muffler aperture and another one of the plurality of side walls both directly face both the muffler and the carburetor.

2. The snow blower as set forth in claim 1, wherein the heater box has an open bottom, and wherein the muffler is located in the heater box such that all of the side walls of the heater box extend below a bottom of the muffler, wherein at least one of the side walls of the heater box extends below the bottom of the carburetor.

3. The snow blower as set forth in claim 1, wherein one of the side walls defines a choke lever aperture that is in the shape of a slot, and further comprising a choke lever that extends from the choke lever aperture, wherein the choke lever is made of plastic.

4. The snow blower as set forth in claim 1, further comprising:
   a choke lever that extends from one of the side walls of the heater box;
   an on/off switch that extends from one of the side walls of the heater box;
   a safety key switch that extends from one of the side walls of the heater box; and
   a primer bulb that extends from one of the side walls of the heater box.

5. The snow blower as set forth in claim 1, wherein the side walls of the heater box define a plurality of vents that are located within two inches of the top wall of the heater box, and further comprising a drip ledge that extends from one of the side walls of the heater box, wherein the drip ledge extends at an angle to the top wall of the heater box such that fluid present within the drip ledge flows via gravity off of the drip ledge.

6. The snow blower as set forth in claim 1, further comprising:
   an interior heat shield located in the interior of the heater box and contacting the side walls of the heater box, wherein the interior heat shield shields the top wall of the heater box from temperature elevation; and
   an on/off switch heat shield that has a plurality of walls, wherein the walls of the on/off switch heat shield shields an on/off switch carried by the heater box from temperature elevation;
   wherein the side wall of the heater box that defines the muffler aperture for use in venting exhaust gases from the muffler additionally defines a second muffler aperture for use in venting exhaust gases from the muffler;
   wherein the heater box, the interior heat shield, and the walls of the on/off switch heat shield are made of sheet steel.

7. The snow blower as set forth in claim 1, further comprising:
   a recoil intake section;
   a gas tank having a gas cap located at a top surface of the gas tank, wherein a spill depression is defined in the top surface of the gas tank that opens towards a side of the gas tank that is opposite from the recoil intake section, wherein the gas tank is located within two inches from one of the walls of the heater box;
   a gasoline drip ledge that extends from the side of the gas tank that is opposite from the recoil intake section, wherein the gasoline drip ledge extends at an angle to the side of the gas tank such that gasoline present within the gasoline drip ledge flows via gravity away from the heater box and off of the gasoline drip ledge;
   a governor linkage;
   a governor linkage shield guard that covers the governor linkage, wherein the governor linkage shield guard is at least partially located under the gas tank;
   a half moon shield located below the gas tank, wherein the half moon shield prevents debris from entering an area located below the gas tank; and
   an ignition control box mounting bracket that mounts an ignition control box below the heater box such that the ignition control box is not covered by the heater box, wherein the ignition control box mounting bracket mounts an outlet portion of a crank case vent tube thereon so that exhausts gases from the crank case vent tube are directed away from the heater box.

8. A heater box for use with a snow blower, comprising:
   a top wall; and
   a plurality of side walls that extend from the top wall that define the sides of the heater box so as to form a portion of the exterior outer perimeter of the heater box, wherein the sides of the heater box define a choke lever aperture, an on/off switch aperture, a safety key switch aperture, a primer bulb aperture, and a muffler aperture;
   wherein the top wall and the plurality of side walls define a common interior of the heater box into which a muffler and a carburetor are located, wherein air present in the common interior is heated by the muffler and is input to the carburetor from the common interior, wherein two of the plurality of side walls both directly face both the muffler and the carburetor.

9. The heater box as set forth in claim 8, wherein the heater box has an open bottom, and wherein the muffler is located in the interior of the heater box such that the top and sides of the muffler are covered by the top wall and the plurality of side walls of the heater box, wherein one of the side walls of the heater box does not extend below the carburetor.

10. The heater box as set forth in claim 8, wherein the heater box has an interior heat shield that contacts the plurality of side walls of the heater box, wherein the interior heat shield shields the top wall of the heater box from temperature elevation, wherein the heater box has an on/off switch heat shield that has a plurality of walls that shield an on/off switch configured for being carried by the heater box from temperature elevation.

11. The heater box as set forth in claim 8, wherein the plurality of side walls define a plurality of vents for use in venting fumes from the interior of the heater box, wherein the vents are located proximate to the top wall of the heater box.

12. The heater box as set forth in claim 8, wherein one of the side walls is a front surface of the heater box that defines a pair of muffler apertures for use in venting exhaust gases from a muffler, wherein an additional one of the side walls is a back surface of the heater box that is opposite from the front surface of the heater box and that has a drip ledge located thereon, wherein the drip ledge extends at an angle to the top wall of the heater box such that fluid present within the drip ledge flows via gravity off of the drip ledge, wherein the top wall and the side walls are made of sheet steel.

13. A snow blower, comprising:
a muffler that has a top wall and at least one side wall that extends downward from the top wall of the muffler;
a heater box that has a top wall that covers the top wall of the muffler, wherein the heater box has at least two side walls that extend downward from the top wall of the heater box so as to form a portion of the exterior outer perimeter of the heater box, wherein one of the side walls of the heater box extends around the at least one side wall of the muffler so as to cover at least a portion of the height of the at least one side wall of the muffler, wherein the heater box has an interior; and
a carburetor located in the interior, wherein the muffler is located in the interior such that the interior is a common interior to both the muffler and the carburetor, wherein air present in the common interior is heated by the muffler and is input to the carburetor from the common interior, wherein two of the side walls both directly face both the muffler and the carburetor.

14. The snow blower as set forth in claim 13, wherein the side wall of the heater box that extends around the at least one side wall of the muffler covers the entire height of the at least one side wall of the muffler and covers the entire height of the carburetor.

15. The snow blower as set forth in claim 13, wherein the heater box has an open bottom, and further comprising an ignition control box mounting bracket that is configured for mounting an ignition control box below the open bottom of the heater box such that the ignition control box is not covered by the at least two side walls of the heater box, wherein the ignition control box mounting bracket is configured for mounting an outlet portion of a crank case vent tube thereon so that exhausts gases from the crank case vent tube are directed away from the interior of the heater box.

16. The snow blower as set forth in claim 13, further comprising a drip ledge that extends from one of the side walls of the heater box, wherein the drip ledge extends at an angle to the at least one side wall of the heater box such that fluid present within the drip ledge flows via gravity off of the drip ledge.

17. The snow blower as set forth in claim 13, further comprising:
a recoil intake section;
a gas tank having a gas cap located at a top surface of the gas tank, wherein a spill depression is defined in the top surface of the gas tank that opens towards a side of the gas tank that is opposite from the recoil intake section; and
a gasoline drip ledge that extends from the side of the gas tank that is opposite from the recoil intake section, wherein the gasoline drip ledge extends at an angle to the side of the gas tank such that gasoline present within the gasoline drip ledge flows via gravity away from the heater box and off of the gasoline drip ledge.

18. The snow blower as set forth in claim 13, further comprising:
a gas tank;
a governor linkage;
a governor linkage shield guard that covers the governor linkage, wherein the governor linkage shield guard is at least partially located under the gas tank; and
a half moon shield located below the gas tank, wherein the half moon shield prevents debris from entering an area located below the gas tank.

19. The snow blower as set forth in claim 13, wherein the heater box has an interior heat shield that is located in the interior of the heater box and contacts one of the side walls of the heater box, wherein the interior heat shield shields the top wall of the heater box from temperature elevation, wherein the heater box has an on/off switch heat shield that has a plurality of walls that shield an on/off switch carried by the heater box from temperature elevation.

20. The snow blower as set forth in claim 13, wherein one of the side walls of the heater box defines a plurality of vents that are located proximate to the top wall of the heater box, wherein one of the side walls of the heater box defines a choke lever aperture, an on/off switch aperture, a safety key switch aperture, and a primer bulb aperture, and wherein one of the side walls of the heater box defines a pair of muffler apertures through which exhaust gas of the muffler is vented.

* * * * *